US005410381A

United States Patent [19]
Kameyama et al.

[11] Patent Number: 5,410,381
[45] Date of Patent: Apr. 25, 1995

[54] CAMERA

[75] Inventors: Nobuyuki Kameyama; Hiroshi Ohmura, both of Asaka; Atsuro Yajima, Suwa, all of Japan

[73] Assignee: Fuji Photo Film Co., Ltd., Kanagawa, Japan

[21] Appl. No.: 75,310

[22] Filed: Jun. 11, 1993

[30] Foreign Application Priority Data

Jun. 12, 1992 [JP] Japan .................................. 4-153710
Jun. 12, 1992 [JP] Japan .................................. 4-153711

[51] Int. Cl.6 ...................... G03B 13/10; G03B 17/02; G03B 37/00
[52] U.S. Cl. ................................... 354/222; 354/159; 354/94
[58] Field of Search ................ 354/222, 159, 94

[56] References Cited

U.S. PATENT DOCUMENTS

| | | | |
|---|---|---|---|
| Re. 32,797 | 12/1988 | Harvey | 354/222 X |
| 4,697,901 | 10/1987 | Wakabayashi et al. | 354/222 X |
| 4,773,997 | 11/1990 | Harvey | 354/222 X |
| 5,252,790 | 11/1993 | Tanaka | 354/159 X |
| 5,257,055 | 10/1993 | Cho et al. | 354/222 |

*Primary Examiner*—M. L. Gellner
*Assistant Examiner*—Nicholas J. Tuccillo
*Attorney, Agent, or Firm*—Young & Thompson

[57] ABSTRACT

A camera having a finder, capable of photographing a first size and a second size, comprises a field frame for the first size, which is provided in front of an eye piece of said finder, and a field frame plate for the second size, which is provided in a manner to be movable between an objective lens and the eye piece of said finder and is formed with display portions for displaying portions other than a field frame and shielding portions. A field frame plate change-over mechanism retracts the field frame plate for the second size out of the optical path of the finder during the photographing of the first size, and disposes the field frame for the second size in the optical path of the finder between the objective lens and the eye piece during the photographing of the second size. This field frame plate shields the field frame for the first size by shielding portions of the field frame plate for the second size. The field frame for the first size comprises marks extending along two opposite sides of a field of view of the finder. The field frame plate comprises a frame that covers these marks when the field frame plate is in the optical path of the finder during the photographing of the second size. The field frame for the second size comprises marks that extend along the same two opposite sides of the field of view of the finder and that are spaced from each other and from the portions of the field frame plate that cover the field frame for the first size.

10 Claims, 8 Drawing Sheets

FIG. 2
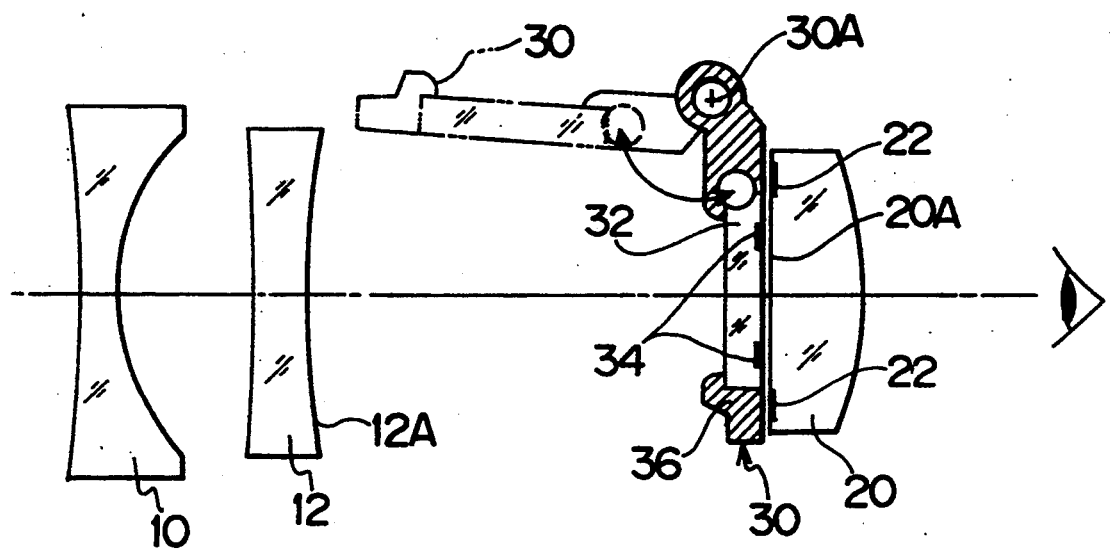
FIG. 3 (A)
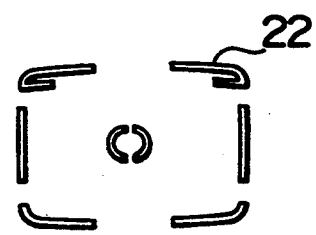
FIG. 3 (B)
FIG. 3 (C)
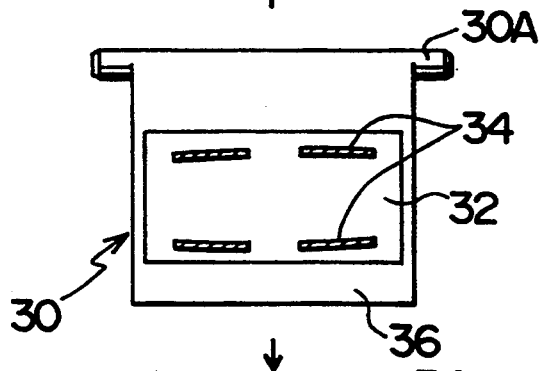

+

↓

CAMERA

BACKGROUND OF THE INVENTION

1. Field of the Invention

This invention relates to a camera, and mope particularly to a camera with additional functions as a panoramic camera, capable of photographing a full size and a panoramic size.

2. Description of the Related Art

Heretofore, a field frame shown in FIG. 12 has been used in a finder applied to a camera capable of photographing a full size and a panoramic size.

In FIG. 12, designated at reference numeral 2 is a field frame for a full size, 4 a field frame for correcting a parallax during the photographing at a near distance, 6 a field frame for the panoramic size and 8 a target mark.

That is, when the photographing of a full size is performed, a composition is determined such that an object enters the field frame 2, when the photographing at a neap distance is performed, the composition is determined such that the object does not enter above the field frame 4, and further, when the photographing of a panoramic size is performed, the composition is determined as such that the object enters the field frame 6.

Incidentally, an aspect ratio of the full size is 2:3 and the aspect ratio of the panoramic size is 1:2.6.

However, in the case of the above-described conventional finder, since both of the field frames can be observed continually, the photographer has to select the field frame depending on either the full size shot or the panoramic size shot, and has to determine the composition as such that the object enters the selected field frame, so that constant care should be taken for the selection of the field frame. Furthermore, such disadvantages tend to occur in that the field frame for the panoramic size shot is mistakenly used during the full size shot and the field frame for the full size shot is mistakenly used during the panoramic size shot.

In a field frame change-over device as described in the specification of the Japanese Utility Model Application No. 131886/1989, there is described the shielding of a normal field frame by a light-shielding portion of a field frame plate for the panoramic shot, but, nothing is described for the specific shielding means. Furthermore, such a disadvantage occurs in that the rays are reflected by a retracted panoramic field frame plate during the normal shot, whereby an image in the finder becomes hard to observe.

In a field frame change-over device as described in the specification of the Japanese Utility Model Application No. 131887/1989, a field frame for the normal shot and a field frame for the panoramic shot are formed on one and the same plate, whereby an unneccessary field frame is selectively shielded by a blind shutter, so that, due to the restriction in space, the degrees of freedom in stroke and shape of the blind shutter are low and it is difficult to completely change over from the field frame for the panoramic shot to the field frame for the normal shot and vice versa.

In a field frame change-over device as described in the specification of the Japanese Utility Model Application No. 60778/1990, since the field frame for the normal shot and the field frame for the panoramic shot are provided independently from each other, designing of the respective field frames is freely performed and the complete change-over of the field frames allows a user to easily observe the display. However, it is difficult to manufacture a transparent display member of a block shape, and the problem of reflections of the top and bottom surfaces of the block-shaped transparent member occurs.

Furthermore, in a field frame change-over device as described in the specification of the Japanese Utility Model Application No. 7746/1990, a real image type finder is used, so that such disadvantages occur in that expensive parts such as a prism are required, thus leading to increase a cost.

SUMMARY OF THE INVENTION

The present invention has been developed to eliminate the above-described disadvantages and has as its aim the provision of a camera provided with a field frame change-over device having an Albada type finder being low in the internal reflecting light and capable of displaying either one of a field frame for a first size and another field frame for a second size depending on either a first size shot or a second size shot.

To achieve the above-described objects, according to the present invention, an Albada type finder applied to a camera capable of photographing the first size and the second size comprises: a field frame for the first size, which is provided in front of an eye piece of the Albada type finder; a field frame plate for the second size, which is provided in a manner to be movable between an objective lens and the eye piece of the Albada type finder; and a field frame change-over mechanism for retracting the field frame plate for the second size out of an optical path of the finder during the first size shot, disposing the field frame for the second size in the optical path of the finder between the objective lens and the eye piece during the second size shot and shielding at least a part of the field frame for the first size by a light shielding portion formed in the field frame plate for the second size.

According to the present invention, the field frame plate for the second size is retracted from the optical path of the finder during the first size shot, whereby the field frame for the second size cannot be observed and only the field frame for the first size can be observed. The field frame for the first size is shielded by a light shielding frame of the field frame plate for the second size during the second shot, whereby the field frame for the first size cannot be observed and only the field frame for the second size can be observed. With this arrangement, only the field frame corresponding to either the first size shot or the second size shot can be displayed.

Furthermore, to achieve the above-described objects, according to the present invention, the Albada type finder applied to the camera capable of photographing the first size and the second size is characterized by comprising: a field frame for the first size, which is provided in front of an eye piece of the Albada type finder; a field frame plate for the second size, which is provided in a manner to be movable between an objective lens and the eye piece of the Albada type finder and formed thereon with a display portion for displaying a portion other than the field frame and a light shielding member; and a field frame change-over mechanism for retracting the field frame plate for the second size out of an optical path of the finder during the first size shot, disposing the field frame plate for the second size in the optical path of the finder between the objective lens and the eye piece during the second size shot and shielding the field frame for the first size by a light shielding member formed in the field frame plate for the second size.

According to the present invention, the field frame plate for the second size is retracted out of the optical path of the finder during the first size shot, whereby the field frame for the second size cannot be observed and only the field frame for the first size can be observed. At this time, excessive internal reflection can be decreased by the light shielding portion covering a display portion for displaying portions other than the field other than the field frame of the field frame plate for the second size. The field frame for the first size is shielded by the light shielding portion of the field frame plate for the second size during the second shot, whereby the field frame for the first size cannot be observed and only the field frame for the second size and the display portion for displaying portions other than the field frame can be observed. At this time, the field frame for the second size can be easily observed owing to the display portion for displaying portions other than the field frame of the field frame plate for the second size. With this arrangement, only the field frame corresponding to either the first size shot or the second size shot can be displayed.

BRIEF DESCRIPTION OF THE DRAWING

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a view showing an optical system of the field frame change-over device of the Albada type finder shown in the first embodiment;

FIGS. 3(A), 3(B) and 3(C) are front views of the field frame shown in the first embodiment;

DESCRIPTION OF THE PREFERRED EMBODIMENTS

Figure 1:
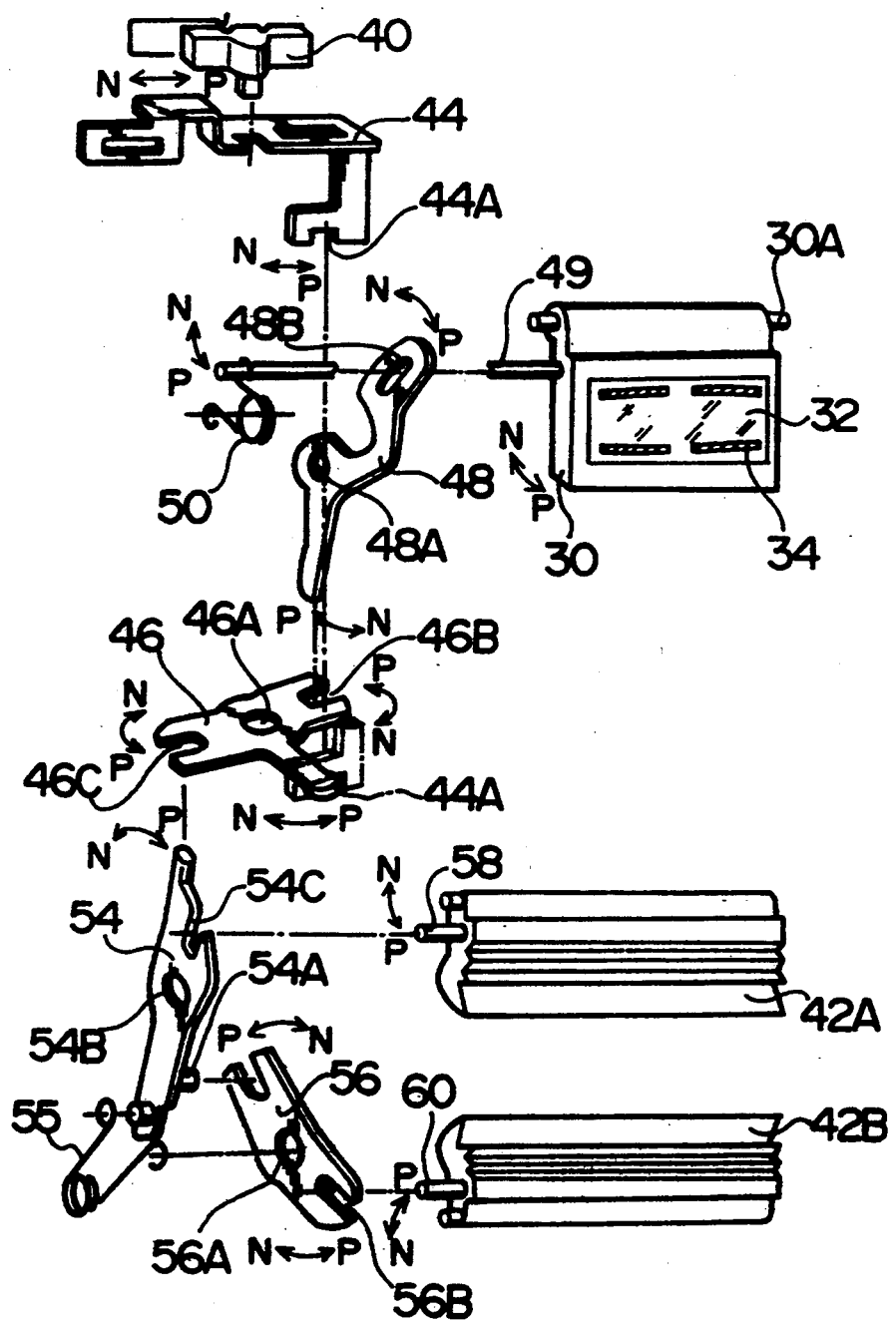
FIG. 1 is an exploded perspective view of the essential portions showing a first embodiment of the camera with additional functions as the panoramic camera, to which the field frame change-over device of the Albada type finder according to the present invention is applied.

Detailed description will hereafter be given of the preferred embodiments of the camera according to the present invention with reference to the accompanying drawings.

Detailed description will be given of the first embodiment of the camera with additional functions as the panoramic camera, which is provided with the field frame change-over device of the Albada type finder according to the present invention.

Firstly, the principle of the field frame change-over device of the Albada type finder according to the present invention will be described with reference to FIGS. 2 and 3.

As shown in FIG. 2, the field frame change-over device of the Albada type finder includes an objective lens 10, a half mirror lens 12 and an eye piece 20. A reflecting film is deposited on a surface 12A at the inside of the half mirror lens so as to obtain a semitransparent concave mirror. A field frame 22 is deposited on a surface 20A at the inside of the eye piece 20. Incidentally, this field frame 22 is a field frame for the full size as shown in FIG. 3(A).

Accordingly, during the photographing for the full size, the field frame 22 is irradiated by a light which has entered from the objective lens 10, the light is reflected by the surface 12A at the inside of the half mirror lens 12 and the focus of a virtual image of the field frame 22 is made at a far-away place. Then, the virtual image of the field frame 22 and an image of the object are simultaneously observed by use of the eye piece 20.

Now, in the field frame change-over device of the Albada type finder according to the present invention, as shown in FIG. 2, a field frame plate 30 is provided in a manner to be movable between the half mirror lens 12 and the eye piece 20. That is, the field frame plate 30 is provided rotatably through a pivot 30A, and, when the field frame plate 30 is rotated in a counterclockwise direction, the field frame plate 30 is inserted between the half mirror lens 12 and the eye piece 20 (the state indicated by solid lines in FIG. 2). When the field frame plate 30 is rotated in a clockwise direction, the field frame plate 30 is retracted from a space formed between the half mirror lens 12 and the eye piece 20 (the state indicated by two-dot chain lines in FIG. 2).

This field frame plate 30 has a transparent plate 32 formed of a planar plate in parallel thereto as shown in FIG. 3(B), and a field frame 34 for the panoramic size is formed on this transparent plate 32. This field frame 34 for the panoramic size is irradiated by a light which has entered from the objective lens 10 in a state where the field frame plate 30 is inserted between the half mirror lens 12 and the eye piece 20 as shown in FIG. 2, and the focus of a virtual image of the field frame 34 for the panoramic size is made.

A frame portion of the field frame plate 30, i.e., a portion other than the transparent plate 32 functions as a light shielding frame 36, and, when the field frame plate 30 is inserted between the half mirror lens 12 and the eye piece 20 as shown in FIG. 2, the light shielding frame 36 of the field frame plate 30 is positioned in front of the field frame 22 for the normal shot to cover the field frame 22. With this arrangement, during the panoramic shot, the field frame 22 for the normal size is shielded, and only the field frame 34 for the panoramic size can be observed as shown in FIG. 3(C). In this case, right and left lines 22A perform an additional function as a field frame for the full size.

When this field frame with additional functions is used as described above, it is desirable to design it so that the corner positions of the field frames are not overlapped with each other as shown in the embodiment, so as not to clearly show a difference in visibility between the field frames 22A and 32. Futhermore, the additional functioning should not necessarily be required and such an arrangement may be adopted that the field frame 22 for the full size is shielded as a whole and the four corners of the field frame for the panoramic size are displayed.

Furthermore, in this embodiment, the field frame 22 for the normal size is covered by the light shielding frame 36 of the field frame plate 30, so that the width of the transparent plate 32 of the field frame plate 30 can be reduced accordingly. As the result, during the normal shot, the quantity of the light reflected by the retracted transparent plate 32 can be reduced, so that an easy-to-observe finder having no excessive reflecting light can be obtained.

FIG. 1 is an exploded perspective view of the essential portions showing the camera with additional functions as the panoramic camera, to which the field frame change-over device of the Albada type finder shown in FIG. 2 is applied.

In FIG. 1, this camera is changed over to a state, in which the panoramic size shot can be performed, by use of a change-over knob 40 for changing over from the panoramic size shot to the full size shot and vice versa, so that the field frame 34 for the panoramic size can be observed as described above. Furthermore, the top and bottom portions of the film, not shown, are shielded by the top and bottom light shielding portions 42A and 42B, so that the exposure at the aspect ratio of the panoramic size can be performed.

The case, in which the change-over is made from the photographing state for the panoramic size to the normal photographing state, will hereafter be described.

In this case, the change-over knob 40 is moved from a position P of the panoramic size to a normal position N in a direction indicated by an arrow. Due to this movement of the change-over knob 40, members to be described hereafter are moved or rotated in directions P→N as indicated by arrows, respectively.

That is, a lever 44 is moved in a direction N as indicated by an arrow and a lever 46 held by an end part 44A thereof is rotated about a shaft 46A in a direction N. Due to this rotation of the lever 46 in the direction N, a lever 48 held by a slot 48B is rotated about a shaft 48A in a direction N as indicated by an arrow. Due to the rotation of the lever 48, a rod 49 held by the slot 48B of the lever 48 is rotated in a direction N as indicated by an arrow, and, due to this rotation of the rod 49, the field frame plate 30 is rotated about a pivot 30A against the biasing force of a spring 50 in a direction N as indicated by an arrow. With this arrangement, the field frame plate 30, which has been inserted between the half mirror lens 12 and the eye piece 20, is retracted, whereby the change-over is made from the field frame 34 for the panoramic size to the field frame 22 for the full size. Incidentally, the spring 50 is made of a click spring, whereby the field frame plate 30 is held at the normal position or the panoramic position.

On the other hand, due to the rotation of the lever 46 in the direction N as indicated by the arrow a lever 54 held by a slot 46C thereof is rotated about a shaft 54B in a direction N as indicated by an arrow against the biasing force of a spring 55.

At the same time, a lever 56 engaged with a pin 54A of the lever 54 is rotated about a shaft 56A in a direction N as indicated by an arrow against the biasing force of the spring 55. Due to the rotation of the lever 54, a rod 58 held by a slot 54C of the lever 54 is rotated in a direction N, and a rod 60 held by a slot 56B of the lever 56 is rotated in a direction N. When the rods 58 and 60 are rotated in the directions N, respectively, the light shielding portions 42A and 42B are rotated in directions N. Then, when the top and bottom light shielding portions 42A and 42B are rotated in the directions N as indicated by the arrows to be retracted, the film, not shown, can be exposed at the aspect ratio of the full size. Incidentally, the spring 55 is made of a click spring, whereby the light shielding portions 42A and 42B are held at the normal position or the panoramic position. In order to perform change-over from the normal position N to the panoramic position P, the above-described steps are reversed.

Figure 4:
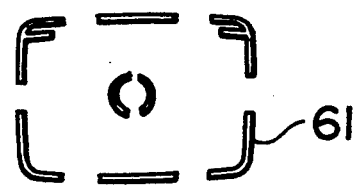
FIGS. 4(A), 4(B) and 4(C) are front views showing another field frame according to the first embodiment.
Figure 4:
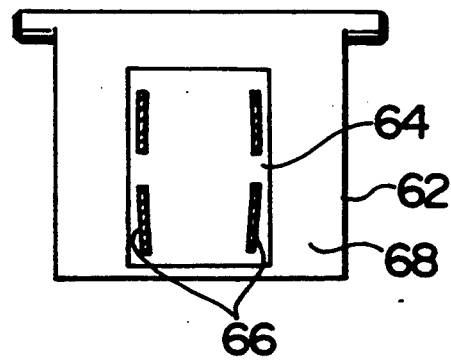
Figure 4:
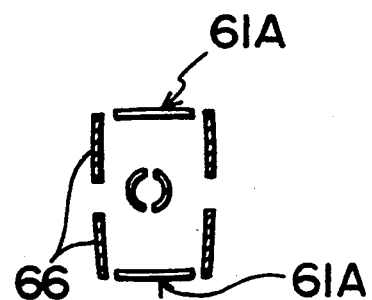

FIG. 4 displays the field frame applied to the camera, capable of changing over from the full size shot to the half size shot and vice versa. That is, FIG. 4(A) displays a field frame 61 of the full size, and this field frame 61 is deposited on a surface 20A at the inside of the eye piece 20 similarly to the field frame 22. Furthermore, a transparent plate 64 is provided on a field frame plate 62 shown in FIG. 4(B), and a field frame 66 for the half size is deposited on this transparent plate 64. A light shielding frame 68 is formed on the field frame plate 62 around the transparent plate 64.

The field frame plate 62 functions similarly to the field frame plate 30, is retracted out of the optical path and displays only the field frame 61 for the full size as shown in FIG. 4(A) during the full size shot, and is inserted into the optical path, shields the field frame 61 by a light shielding frame 68 and displays a field frame 66 for the half size during the half size shot. In this case, top and bottom lines 61A additionally function as the field frame for the full size.

As described above, in the camera with additional functions as the panoramic camera, which is provided with the field frame change-over device of the Albada type finder according to the present invention, only either one of the field frame for the first size and the field frame for the second size can be displayed depending on either the first size shot or the second size shot, so that the field frame can easily observed, thus solving the problem that the composition is determined with the mistaken field frame being used.

Detailed description will hereafter be given of the second embodiment of the camera with additional functions as the panoramic camera, which is provided with the field frame change-over device of the Albada type finder according to the present invention.

Figure 8:
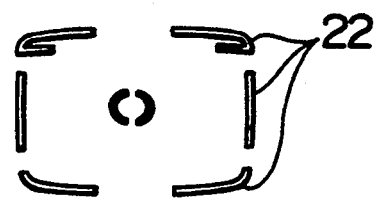
FIGS. 8(A), 8(B) and 8(C) are front views showing the field frame in the second embodiment.
Figure 8:
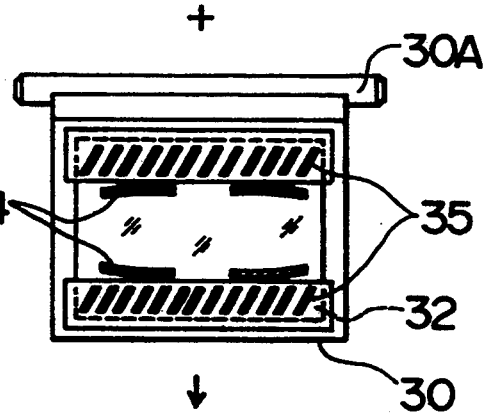
Figure 8:
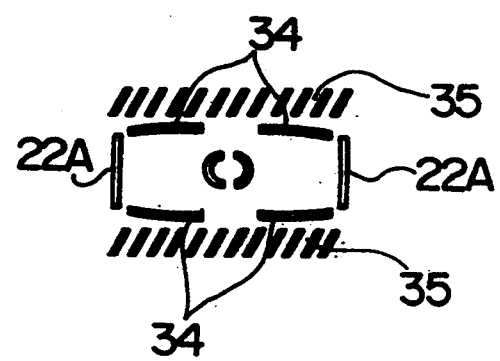

Firstly, the principle of the field frame change-over device of the Albada type finder according to the present invention will be described with reference to FIGS. 6 and 8. Incidentally, same reference characters are used to designate the same or similar parts corresponding to ones as shown in the first embodiment, and the detailed description been not be repeated.

Figure 6:
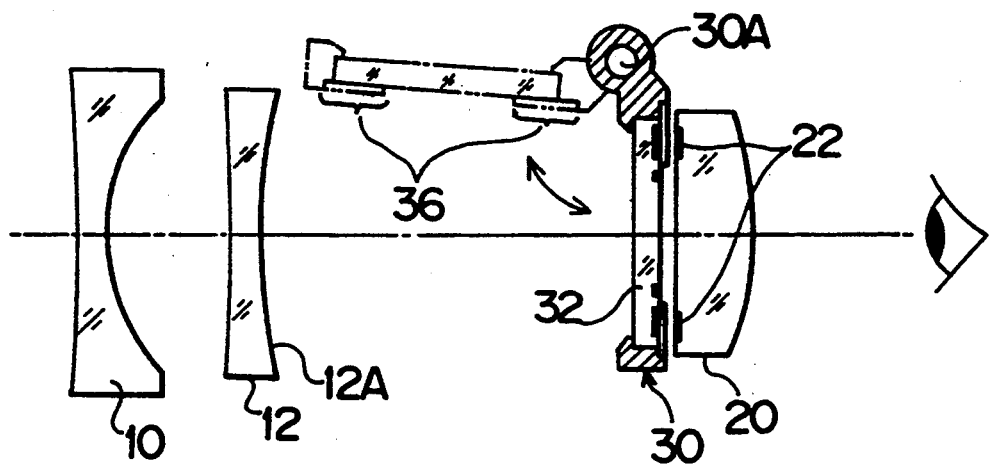
FIG. 6 is a view showing an optical system of the field frame change-over device of the Albada type finder shown in the first embodiment.
Figure 7:
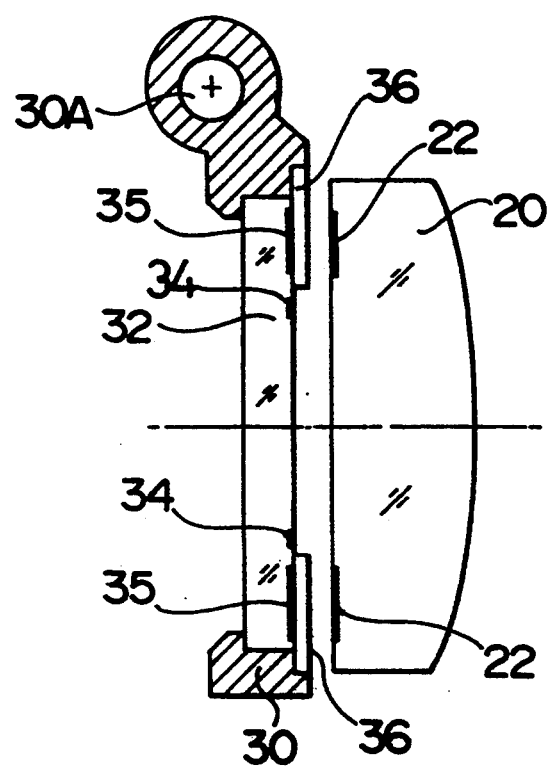
FIG. 7 is an enlarged view of the field frame plate shown in FIG. 6.

The field frame plate 30 shown in FIG. 6 has a transparent plate 32 shown in FIG. 8(B), and the field frame 34 for the panoramic size and display portions 35 for displaying portions other than the field frame are deposited on this transparent plate 32. These display portions 35 for displaying portions other than the field frame are formed of a continuously hatched pattern in an example shown in FIG. 8(B). Further, as shown in FIG. 7, shielding sheets 36 are attached onto the display portions 35 for displaying portions other than the field frame. In a state, in which the field frame plate 30 is inserted between the half mirror lens 12 and the eye piece 20 as shown in FIG. 6, the field frame 34 for the panoramic size and the display portions 35 for displaying portions other than the field frame are irradiated by the light, which has entered from the objective lens 10, whereby the focuses of the virtual images of the field frame 34 for the panoramic size and the display portions 35 for displaying portions other than the field frame are made. When the field frame plate 30 is inserted between the half mirror lens 12 and the eye piece 20 as shown in FIG. 6, the shielding sheets 36 of the field frame plate 30 are positioned in front of the field frame 22 for the full size of the eye piece 20 and cover the field frame 22 for the full size. With this arrangement, the field frame 22 for the full size is shielded during the panoramic size shot, whereby, as shown in FIG. 8(C), only the field frame 34 for the panoramic size and the display portions 35 for displaying portions other than the field frame can be observed. As apparent from FIG. 8(C), the display portions 35 for displaying portions other than the field frame are formed for shielding the portion other than the field frame 34 for the panoramic size, so that the field frame 34 for the panoramic size becomes clear. Incidentally, the right and left lines 22A additionally function as the field frame for the full size.

In this embodiment, the part of the display portions for displaying portions other than the field frame of the transparent plate 32 is covered by the light shielding sheet, so that, during the normal shot (i.e., when retracted), there is an effect of reducing the reflecting surface of the transparent plate 32, thus preventing the excessive reflecting light.

Figure 5:
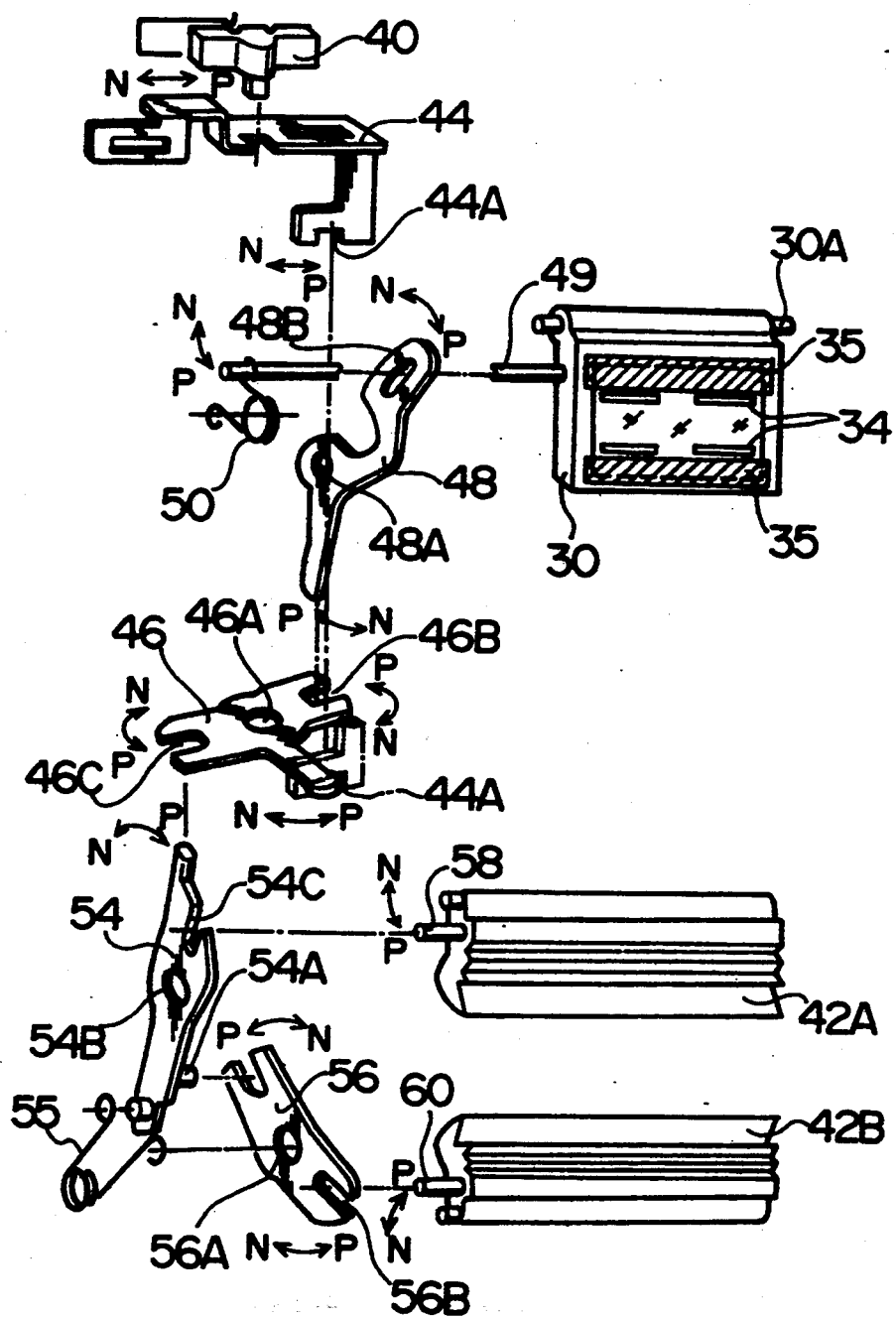
FIG. 5 is an exploded perspective view of the essential portions showing a second embodiment of the camera with additional functions as the panoramic camera, to which the field frame change-over device of the Albada type finder according to the present invention is applied.

FIG. 5 is the oblique view of the essential portions showing the camera with additional functions as the panoramic camera, to which is applied the field frame change-over device of the Albada type finder shown in FIG. 6.

In FIG. 5, this camera is changed over to a state, in which the panoramic size shot is possible, by the change-over knob 40 for changing over from the full size shot to the panoramic size shot, so that the field frame 34 for the panoramic size and the display portions 35 for displaying portions other than the field frame can be observed. Furthermore, the top and bottom portions of the film, not shown, are shielded by the top and bottom light shielding portions 42A and 42B, so that the film can be exposed at the aspect ratio of the panoramic size.

The change-over from the state of the photographing for the panoramic size to the state of the photographing for the normal size is similar to that of the first embodiment, so that the description is omitted.

Figure 9A:
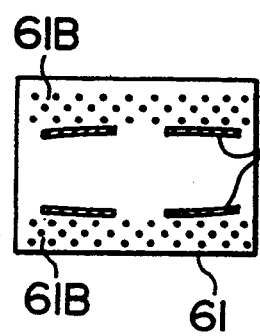
FIGS. 9(A), 9(B) and 9(C) are front views showing another field frame plate according to the second embodiment.
Figure 9B:
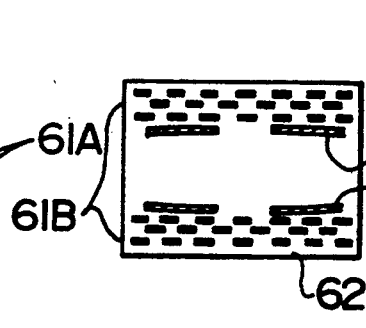
Figure 9C:
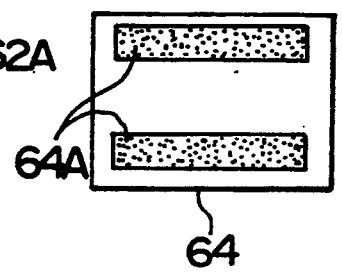

FIG. 9 shows another embodiment of the field frame plate, display portions 61B for displaying portions other than the field frame with a pattern of small drops are formed on a transparent plate 61 shown in FIG. 9(A) in addition to a field frame 61A, display portions 62B for displaying portions other than the field frame with a checkered pattern are formed on a transparent plate 62 shown in FIG. 9(B) in addition to a field frame 62A, and display portions 64A for displaying portions other than the field frame are formed on a transparent plate 64 shown in FIG. 9(C). In the case of FIG. 9(C), the top and bottom edges of the display portions 64A for displaying portions other than the field frame additionally function as the field frame for the panoramic size.

Figure 10:
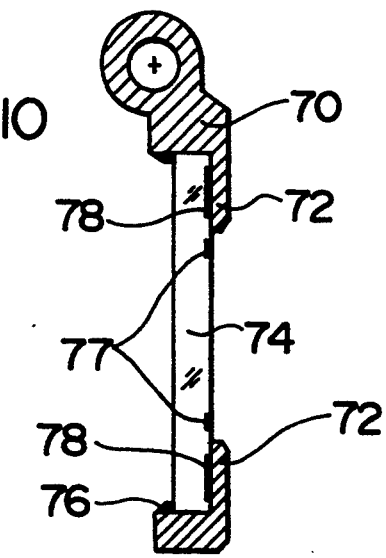
FIG. 10 is an enlarged view showing a further field frame plate according to the second embodiment.

The shielding portions are not limited to the shielding sheet and may be a plastic plate. Furthermore, as shown in FIG. 10, part of a field frame plate 70 may form shielding portions 72. In this case, a transparent plate 74 is fixed to the field frame plate 70 through thermal caulking 76 and the like. Incidentally, in FIG. 10, designated at 77 is a field frame for the panoramic size and 78 display portions for displaying portions other than the field frame.

Figure 11A:
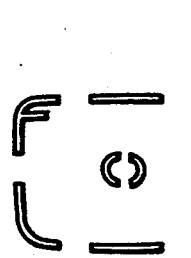
FIGS. 11 (A), (B) and (C) are enlarged view showing a still further field frame plate according to the second embodiment.
Figure 11B:
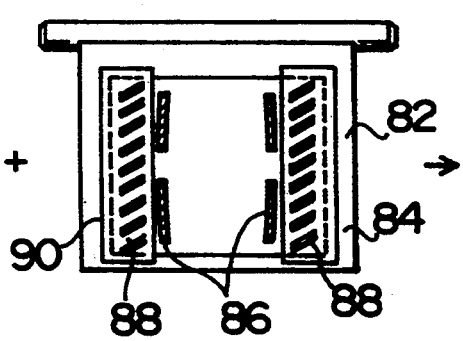

FIG. 11 displays the field frame applied to the camera, in which the change-over from the full size shot to the half size shot and vice versa can be performed for use. That is, FIG. 11(A) displays a field frame 80 for the full size, and this field frame 80 is deposited on the surface 20A at the inside of the eye piece 20 similarly to the field frame 22. Furthermore, a half size lens 84 is provided on a field frame plate 82 shown in FIG. 11(B), and a field frame 86 for the half size and displaying portions 88 for displaying portions other than the field frame are deposited on this half size lens 82. A light shielding sheet 90 is formed on the display portions 88 for displaying portions other than the field frame.

Figure 11C:
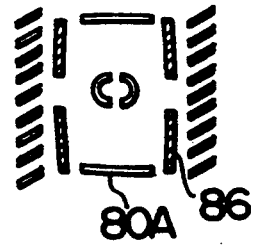
Figure 12:
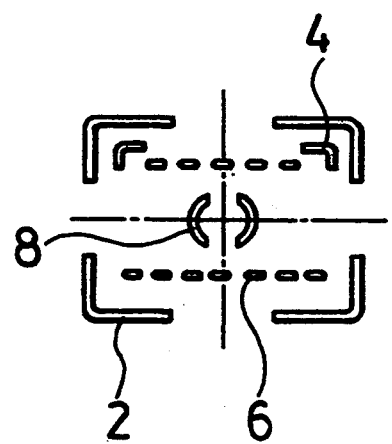
FIG. 12 is a front view showing the field frame of the conventional finder, which is applied to the camera with additional functions as the panoramic camera.

The field frame plate 82 functions similarly to the field frame plate 30, is retracted out of the optical path to display only the field frame 80 for full size as shown in FIG. 11(A) during the full size shot, and, is inserted into the optical path, shields the field frame 80 by the shielding sheet 90 and displays the field frame 86 for the half size and the displaying portions 88 for displaying portions other than the field frame as shown in FIG. 11(C) during the half size shot. In this case, top and bottom lines 80A additionally function as the field frame for the full size.

In the embodiment of the present invention, the first size is referred to the full size and the second size is referred to the panoramic size. However, the second size may be referred to a cinema size or a high vision size. Futhermore, the first size and the second size may be selected out of the full size, panoramic size, cinema size and high vision size. In the camera with additional functions as the panoramic camera, which is provided with the field frame change-over device of the Albada type finder according to the present invention, only either one of the field frame for the first size and the field frame for the second size can be displayed depending on either the first size shot or the second size shot. The field frame for the first size is covered by the shielding portions and the field frame for the second size is clearly shown by use of the displaying portions for displaying portions other than the field frame, so that the field frame can be easily observed, thereby solving the problem that the composition is made with the mistaken field frame being used. Furthermore, when the field frame plate is retracted, the shielding portions have the effect of reducing the reflected light in the finder, thus obtaining an-easy-to-observe finder with no excessive reflecting light.

It should be understood, however, that there is no intention to limit the invention to the specific forms disclosed, but on the contrary, the invention is to cover all modifications, alternate constructions and equivalents failing within the spirit and scope of the invention as expressed in appended claims.

What is claimed is:

1. A camera having a finder, capable of photographing a first size and a second size, comprising:
   a field frame for the first size, which is provided in front of an eye piece of said finder;
   a field frame plate for the second size, which is provided in a manner to be movable between an objective lens and the eye piece of said finder and formed with display portions for displaying portions other than a field frame and shielding portions; and
   a field frame plate change-over mechanism for retracting the field frame plate for the second size out of an optical path of the finder during the photographing of the first size, and for disposing the field frame for the second size in the optical path of the finder between the objective lens and the eye piece during the photographing of the second size, said field frame plate shielding the field frame for the first size by shielding portions of the field frame plate for the second size;
   wherein said field frame for the first size comprises marks extending along two opposite sides of a field of view of said finder, said field frame plate comprising an opaque frame that covers said marks when said field frame plate is in the optical path of the finder during the photographing of the second size, said field frame for the second size comprising marks on a transparent field of said field frame plate that extend along the same said two opposite sides of the field of view of the finder and that are spaced from each other and from those portions of said opaque frame that cover said field frame for the first size.

2. The camera as set forth in claim 1, wherein, when the field frame plate for the second size enters the optical path and the photographing of the second size is performed, the field frame for the second size is formed by use of a part of the field frame for the first size.

3. The camera as set forth in claim 1, wherein, in synchronism with said field frame plate change-over mechanism, light shielding portions for shielding a film are retracted out of the optical path during the photographing of the first size and said light shielding portions shield the film such that the film is exposed at an aspect ratio of the second size during the photographing of the second size.

4. The camera as set forth in claim 1, wherein the first size is a full size and the second size is a panoramic size.

5. The camera as set forth in claim 1, wherein said display portions for displaying portions other than a field frame are made of a continuously hatched pattern.

6. The camera as set forth in claim 1, wherein said display portions for displaying portions other than a field frame are made of small dots.

7. The camera as set forth in claim 1, wherein said display portions for displaying portions other than a field frame are made of a checkered pattern.

8. The camera as set forth in claim 1, wherein top and bottom edges of said display portions for displaying portions other than a field frame perform an additional function as a field frame for the second size.

9. The camera as set forth in claim 1, wherein said shielding portions are made of shielding sheets.

10. The camera as set forth in claim 1, wherein said shielding portions are made of a part of the field frame plate for the second size.

* * * * *